May 10, 1927.

W. F. SCHACHT

BUMPER

Filed Aug. 29, 1925

1,628,277

Inventor
William F. Schacht
By Alexander Lwill
Attorneys

Patented May 10, 1927.

1,628,277

UNITED STATES PATENT OFFICE.

WILLIAM F. SCHACHT, OF HUNTINGTON, INDIANA.

BUMPER.

Application filed August 29, 1925. Serial No. 53,324.

This invention is a novel improvement in so-called "bumpers" such as are commonly used on closet seats, lids, doors, etc., to cushion impact, lessen noise and prevent injury to surfaces or material by "slamming" of the seat, etc.

I will explain the invention with reference to the accompanying drawings which illustrate a bumper embodying the same, and summarize in the claims the invention for which protection is desired.

The bumper 1 is preferably made of rubber or other suitable resilient material, preferably by molding same by any suitable means and vulcanizing by any suitable process.

Figure 1:
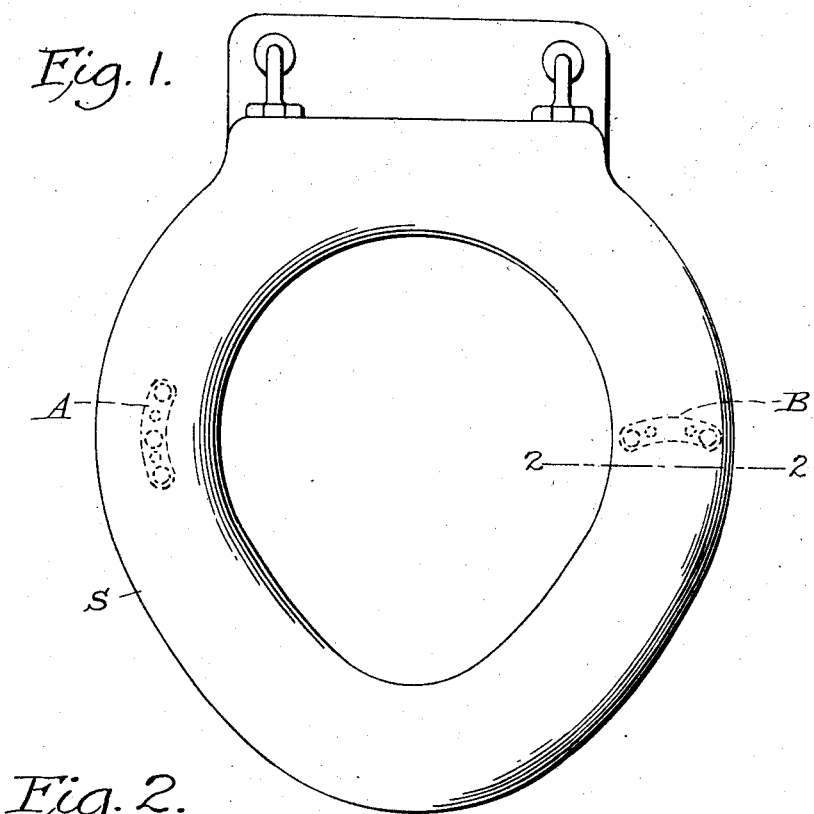
Figure 1 is a plan view of a closet seat with bumpers attached; and illustrating two ways in which the bumper may be attached to the seat.
Figure 2:
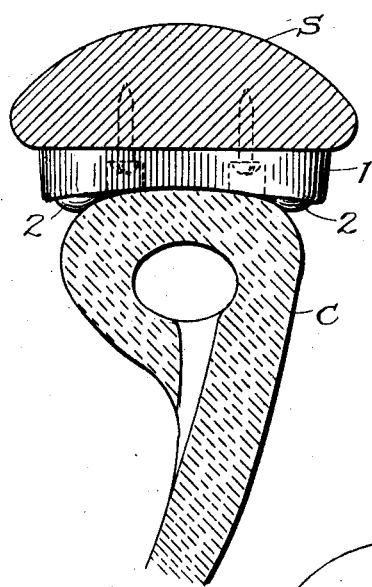
Figure 2 is an enlarged transverse sectional view on the line 2—2 Figure 1, illustrating the efficiency of the bumper in use.
Figure 3:
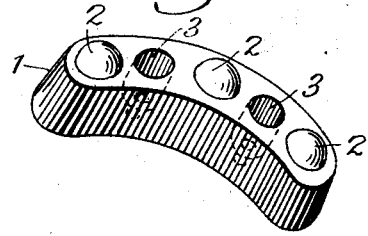
Figure 3 is a perspective view of the bumper detached.

As shown the bumper is curved or approximately crescent shaped in plan view; and is curved in this manner so that when applied to a seat, as indicated at A in Figure 1, it will have a full length bearing surface to the bowl, and thus greatly prolonging the extent of wear of the bumper and also present more contact surface to the bowl. The said bumper is preferably provided on its under side with knobs or projections 2, as indicated, at each end thereof, and may also if desired be provided with an intermediate knob or projection 2, (Fig. 3). These end knobs not only enhance the durability of the bumper but also perform a very useful function, in that when the bumper is applied to the seat S, as indicated at B in Figure 1, and in Figure 2, it is disposed transversely of the rim of the closet bowl C and the central portion of the bumper will contact with and rest on the bowl, as indicated in Figure 2, while the end knobs 2 project below the top of the bowl rim and lower surface of the bumper in position to prevent lateral oscillation or slip of the seat on the bowl, and thus securely position the seat as indicated in Figure 2. When the bumpers are applied in this way the central knob 2 could be omitted or removed, if desired. In any case as the greatest pressure is at the central portion of the bumper, when arranged as indicated at B, the knobs 2 will operate to prevent lateral displacement of the seat as above stated.

The bumper may be secured to the seat in any suitable way. As shown it is provided with two sockets or bores 3, preferably adjacent its ends, in which fastening nails or screws may be inserted, as indicated in Figure 2. These bores 3 extend only partially through the bumper, but apertures at their lower ends extend through the upper portion of the bumper to accommodate the shanks of the nails or screws inserted in the bores.

As stated the bumper is preferably molded of rubber or rubber composition; and if desired it can be reinforced by fabric, as is common in the manufacture of vulcanized rubber articles, and as will readily be understood by those skilled in the art of molding and vulcanizing rubber.

I claim:

1. A bumper for the purpose specified comprising a longitudinally curved body of uniform cross section provided with knobs on its under sides adjacent its ends, and with sockets for the accommodation of fastening devices.

2. A bumper for closet seats and the like comprising a longitudinally curved body portion adapted when disposed longitudinally of the closet bowl rim to suit the curvature thereof; said body being provided with spaced knobs on its under side; and with sockets for the accommodation of fastening devices.

In testimony that I claim the foregoing as my own, I affix my signature.

WILLIAM F. SCHACHT.